United States Patent [19]

Cates

[11] 3,995,689
[45] Dec. 7, 1976

[54] AIR COOLED ATMOSPHERIC HEAT EXCHANGER

[75] Inventor: Robert E. Cates, Leawood, Kans.

[73] Assignee: The Marley Cooling Tower Company, Mission, Kans.

[22] Filed: Jan. 27, 1975

[21] Appl. No.: 544,648

[52] U.S. Cl. .................................. 165/166; 62/304; 165/172; 165/DIG. 1; 261/152; 261/155; 261/158; 261/DIG. 11
[51] Int. Cl.[2] ........................ F28F 3/04; F28F 3/08
[58] Field of Search ...................... 165/DIG. 1, 166; 261/DIG. 11

[56] References Cited
UNITED STATES PATENTS

| | | | |
|---|---|---|---|
| 3,165,455 | 1/1965 | Rose et al. | 165/DIG. 1 |
| 3,211,219 | 10/1965 | Rosenblad | 165/166 |
| 3,328,264 | 6/1967 | Wartenberg | 165/DIG. 1 |
| 3,473,604 | 10/1969 | Tiefenbacher | 165/166 |
| 3,537,165 | 11/1970 | Paddock et al. | 165/166 |
| 3,635,042 | 1/1972 | Spangemacher | 165/DIG. 1 |
| 3,759,322 | 9/1973 | Nasser et al. | 165/166 |
| 3,783,090 | 1/1974 | Anderson et al. | 165/166 |
| 3,808,104 | 4/1974 | Davidson | 165/166 |
| 3,820,353 | 6/1974 | Shiraishi et al. | 165/DIG. 1 |
| 3,831,667 | 8/1974 | Kilgore et al. | 165/DIG. 1 |
| 3,913,667 | 10/1975 | Meylan et al. | 165/115 |

*Primary Examiner*—Albert W. Davis, Jr.
*Assistant Examiner*—Sheldon Richter
*Attorney, Agent, or Firm*—Schmidt, Johnson, Hovey & Williams

[57] ABSTRACT

A low cost, preformed, synthetic resin, indirect air cooled atmospheric heat exchanger especially adapted for use in water cooling towers is provided which exhibits enhanced water cooling properties notwithstanding fabrication thereof from relatively inexpensive, corrosion-free polyvinyl chloride or like materials heretofore thought to have insufficient heat conductivity for practical use in heat exchangers. These improved results stem principally from the use of a plurality of spaced, elongated, hollow, open-ended, thin tube-like hot water receiving structures having vacuum-formed sidewalls configured with a multiple-chevron corrugation pattern to rigidify the exchanger and present series of continuous, vertically extending serpentine paths which maximizes the prime heat exchange area of the sidewalls and causes the descending water to follow the tortuous internal sidewall flow paths to slow the descent of the water and thereby facilitate cooling thereof; moreover, the corresponding, undulating outside wall surfaces of the exchanger increase the turbulence of external cooling air currents flowing therepast to further enhance the overall cooling efficiency of the exchanger. The latter is advantageously positioned below a hot water distribution basin so that quantities of air are siphonically entrained within the descending water to further slow the travel thereof through the exchanger and also preclude build-up of the normally slight, negative pressures therewithin to a level sufficient to collapse the relatively thin sidewalls of the exchanger. In preferred forms, the exchanger is fabricated from a plurality of elongated, inverted, substantially U-shaped, preformed members interconnected along respective vertical margins to present a pack adapted to be tensionably supported in a water cooling tower structure. In addition, the packs are nestably stackable to permit easy installation and use thereof in a variety of cooling tower applications, for example in those employing both a wet and dry fill in combination.

19 Claims, 15 Drawing Figures

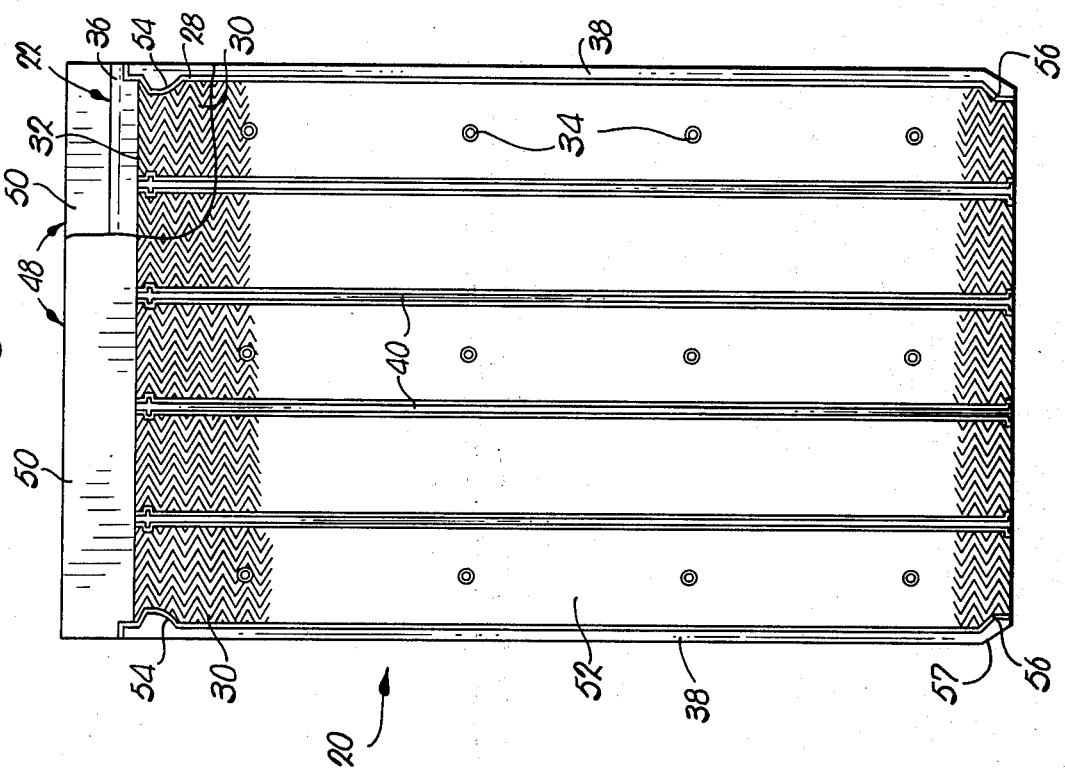
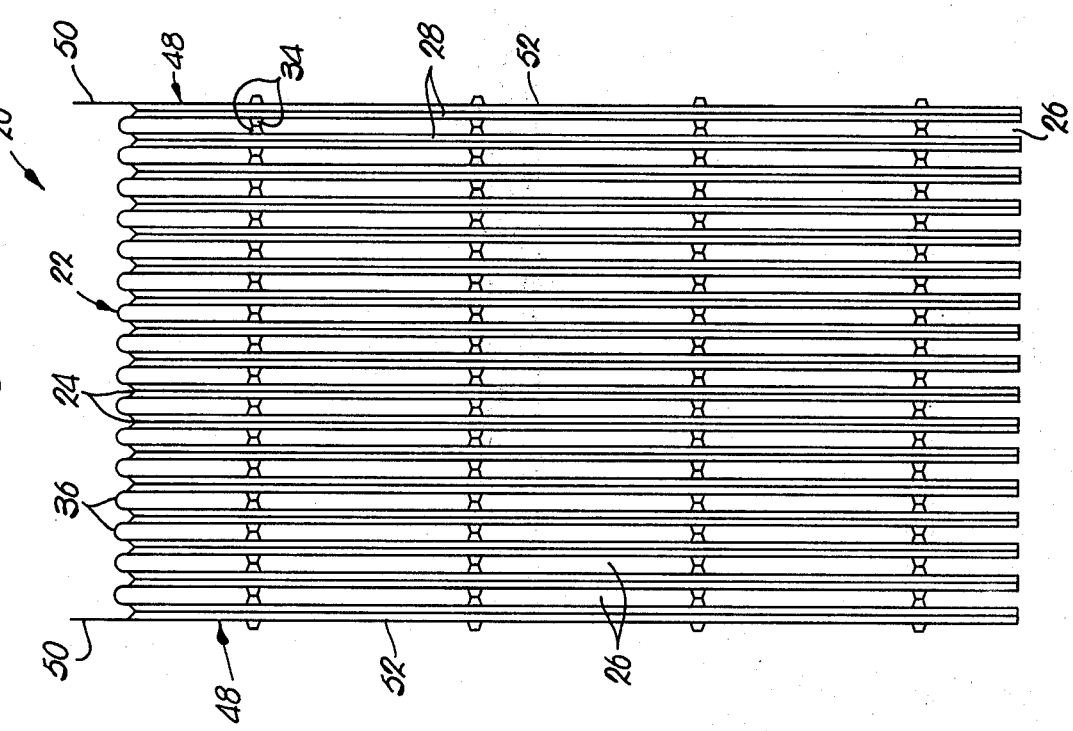

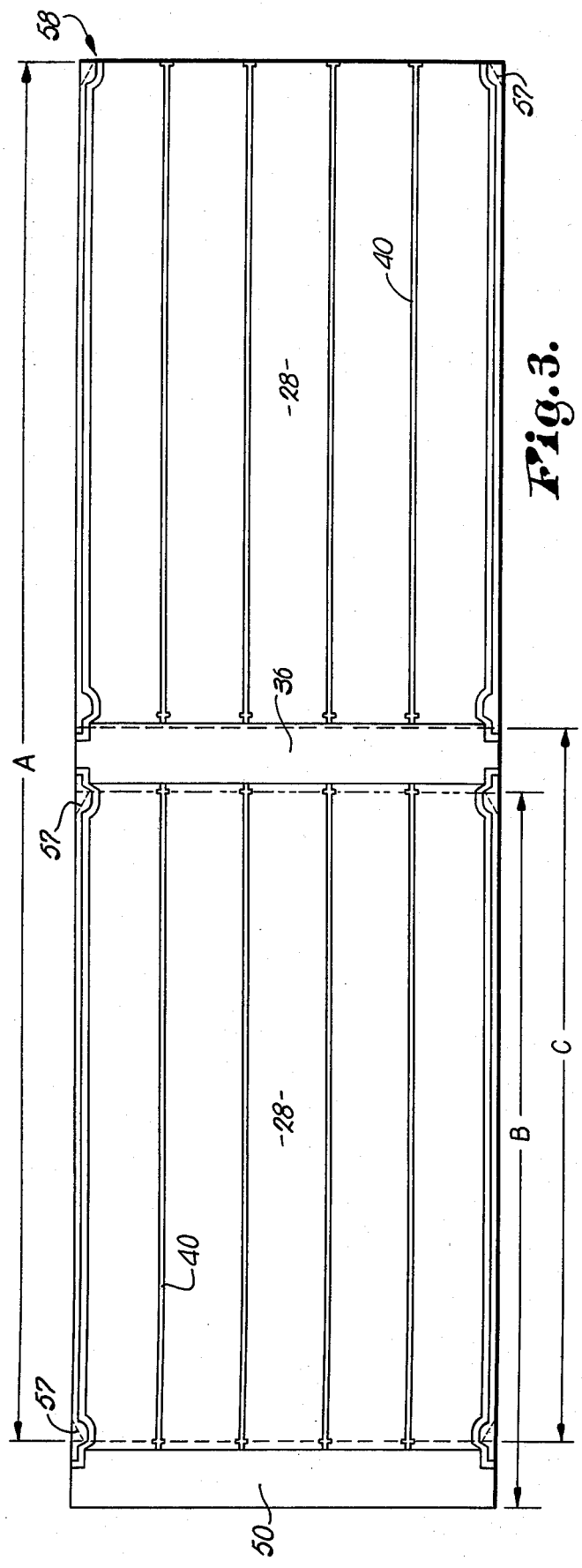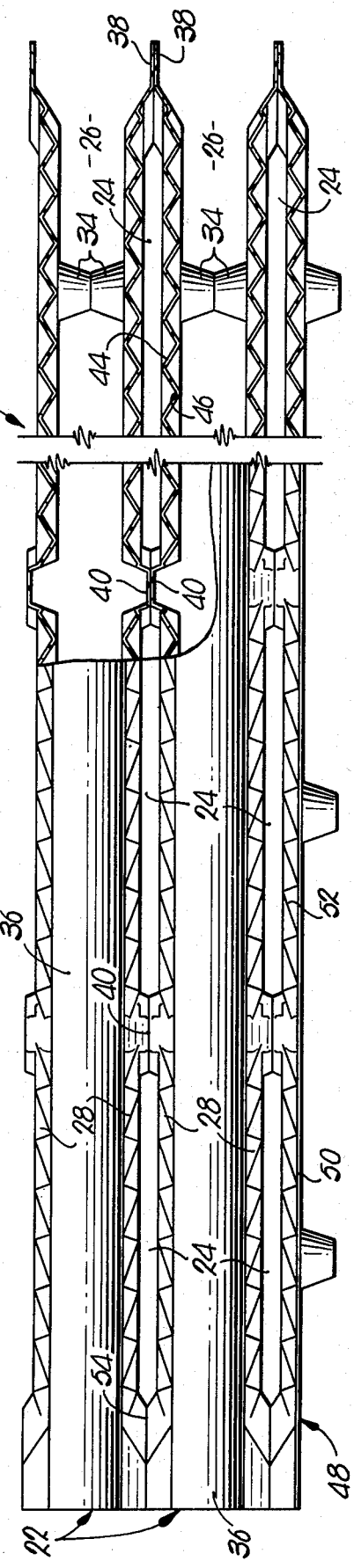

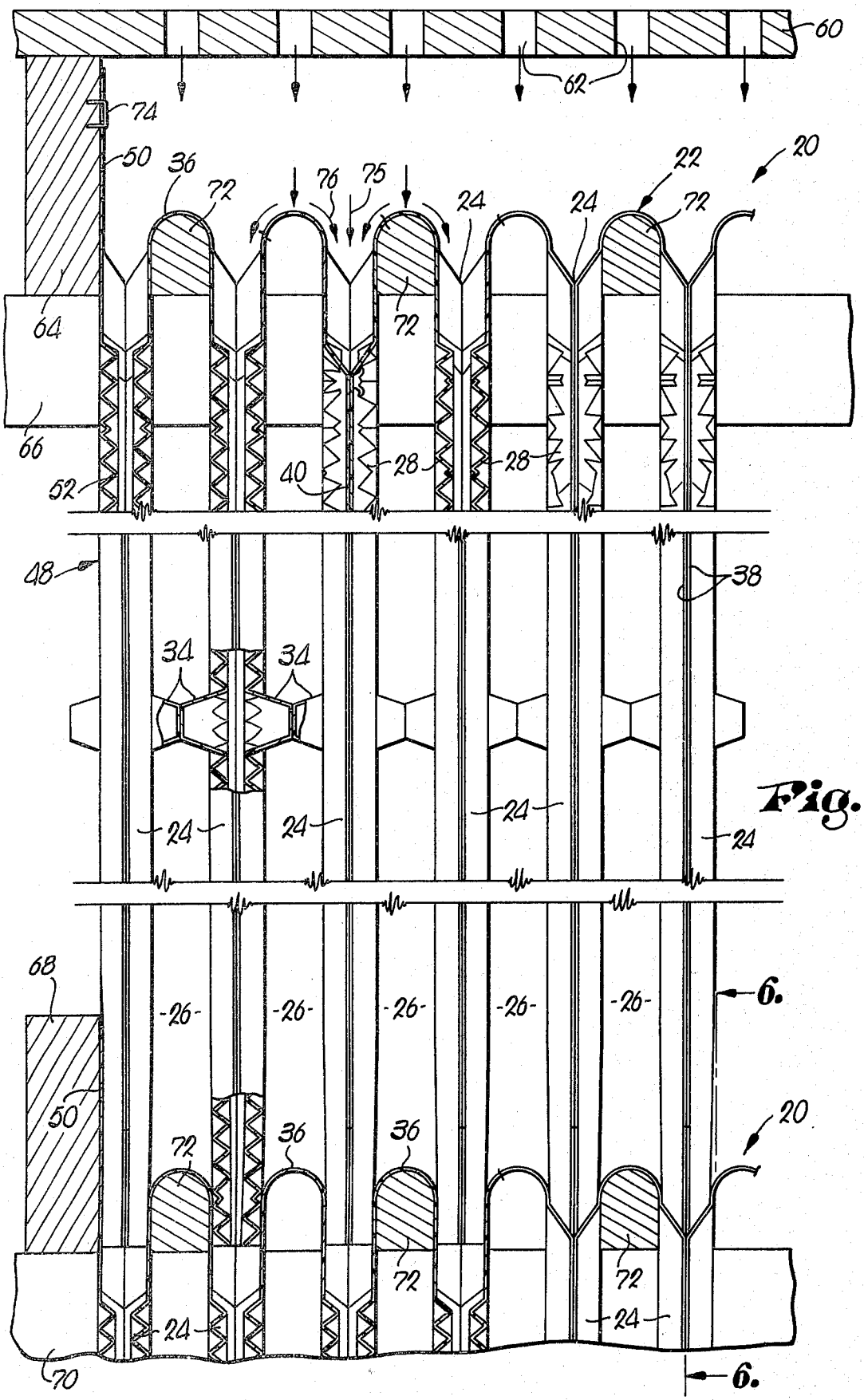

AIR COOLED ATMOSPHERIC HEAT EXCHANGER

This invention relates to air cooled, atmospheric, indirect heat exchangers especially adapted for use in water cooling towers. More particularly, it is concerned with low cost, prefabricated, synetetic resin heat exchangers which are especially configured and arranged to effectively overcome problems stemming from the fact that the synthetic resin materials employed in the fabrication thereof (e.g., polyvinyl chloride) have relatively low heat conductivities when compared with metal or other materials traditionally used in head exchangers.

Indirect heat exchange structures have been used for many years in a wide variety of applications. In general, water or other liquids to be cooled are passed through a plurality of separate structures of heat conductive material which are in turn contacted with an external cooling medium such as air. The most common type of indirect exchanger is the so-called finned tube heat exchanger. In these units a series of elongated, hollow, metallic tubes are provided, along with a number of generally transversely extending metallic fins which serve to increase the thermal effectiveness of the overall exchanger by increasing the total heat exchange area thereof. A hot liquid to be cooled (such as water) is directed through the exchanger tubes as external ambient derived airstreams are simultaneously directed past the fin and tube arrangement. This has the effect of cooling the hot fluid within the exchanger tubes without any direct contact between the hot fluid and the cooling air.

Indirect heat exchangers have also found wide application in cooling towers, expecially in smaller towers used in conjunction with air conditioning equipment or the like. In most instances, simple finned tube heat exchangers of the type described above are employed in these towers, and in general the cooling efficiencies thereof are sufficient to meet the relatively low heat load requirements normally imposed thereon. However, when larger heat loads must be handled, conventional indirect heat exchanger towers (oftentimes referred to as "dry" towers) are generally too inefficient for practical use. This is particularly troublesome since dry towers are especially advantageous in cases where it is necessary to limit the water consumption as well as the visible discharge or plume oftentimes encountered with large conventional evaporative or wet-type water cooling towers. The fact that dry towers avoid the problem of excess water usage and have essentially no fog of plume problem has led to proposals that the dry concept be employed in larger industrial sized towers, or that evaporative fill and indirect heat exchangers be incorporated into a single tower. The latter is especially attractive because the generally more efficient wet section of a dual-type tower can be utilized when ambient weather conditions permit, but such use can be lessened or eliminated completely as desired, with the consequent increased use of the dry section. All of these factors have led many researchers in the art of water cooling towers to investigate wider applications for indirect heat exchange towers, and as a consequence any developments aimed at increasing the water cooling efficiency of such dry towers could represent a major breakthrough in this art.

Another vexing problem associated with conventional dry towers, and especially those of relatively large capacity, stems from the high cost of the conventional heat exchangers used therein. These units are not only expensive in and of themselves, but require costly header construction and the like for delivery and return of the water being cooled. Therefore, the fact that evaporative water cooling towers are substantially more efficient, as well as being less expensive in meeting a given heat load requirement, has deterred many from utilizing indirect heat exchange cooling towers in situations where their advantages would otherwise be manifest.

It has also been proposed in the past to employ more or less conventional heat exchangers which are formed of synthetic resin materials such as the synthetic plastics. This suggestion has many advantages, especially from the standpoint of cost, since synthetic resin materials are generally much less expensive and easier to fabricate, install, and maintain than heat exchangers formed of metal. However, the most persistent objection to the use of synthetic resin heat exchangers results from the fact that heat conductivity of these materials is relatively low, normally only about 1/100 that of metal. Thus, workers in the art have avoided using synthetic resin heat exchange apparatus because the latter have been though to be inefficient to the point of impracticality.

It is therefore the most important object of the present invention to provide high efficiency, low-cost, indirect heat exchange apparatus especially adapted for use in water cooling towers which is preferably fabricated from relatively thin sheets of synthetic resin material such as polyvinyl chloride and is especially configured to efficiently handle heat loads heretofore considered totally impractical for synthetic resin exchangers by virtue of the relatively low heat conductivity of synthetic resin materials.

Another object of the invention is to provide heat exchange apparatus having a plurality of spaced, elongated, open-top, hollow, thin tube-like structures having opposed sidewalls, with the interior faces of the latter configured to present a series of serpentine water flow paths leading generally from the top of the structures to the bottom thereof. This construction ensures that initially hot quantities of water directed to the exchanger are measurably slowed during descending travel thereof by virtue of flow along the tortuous water paths of the structure-defining sidewalls, so that ambient derived external cooling aristreams can be simultaneously directed for indirect thermal interchange with the hot water within the structures through the sidewalls of the latter.

A still further object of the invention is to provide a water cooling tower having a hot water distributor, a cold water collection basin therebelow, and the efficient indirect heat exchange apparatus hereof positioned between te distributor and collection basin, with the respective open-top hot water receiving structures of the exchanger being spaced below the distributor in order to permit siphon-like entrainment of quantities of air within the hot water gravitating from the distributor. In this manner, the travel time of the water through the exchanger is increased to ensure adequate cooling thereof, and the normally slight siphon-generated negative pressures within the exchanger are not permitted to increase to a level causing inward collapse of the relatively thin synthetic resin sidewalls of the exchanger.

Another aim of the invention is to provide nestable indirect heat exchange packs in accordance with the invention which are fabricated from a plurality of elongated, juxtaposed, inverted, substantially U-shaped vacuum formed synthetic resin members which are interconnected to present alternating hot water receiving passages and cooling air spaces; the relatively thin sidewalls of the U-shaped members are corrugated to present a continuous multiple-chevron pattern which serves to rigidify the exchanger packs, increase the prime heat exchange area thereof, and enhance the overall cooling efficiency of the packs.

Another object of the invention is to provide synthetic resin indirect heat exchanger packs of the type described which are nestably stackable to permit use of a plurality of exchanger packs in a water cooling tower, and particularly in towers employing an evaporative, wet fill section in conjunction with the indirect heat exchangers hereof, so that the high cooling efficiency of the wet section, and the plume abatement capabilities of the dry section, can be obtained in a single tower.

In the drawings:

FIG. 1 is a front elevational view of a synthetic resin, indirect heat exchanger pack in accordance with the invention;

FIG. 2 is a side elevational view of the pack illustrated in FIG. 1, with the upper right hand corner of the pack broken away to expose the internal construction thereof;

FIG. 3 is a plan view of an initially flat sheet employed in the construction of the exchanger pack illustrated in FIGS. 1–2;

FIG. 4 is an enlarged, fragmentary plan view of an exchanger pack in accordance with the invention, shown with parts broken away for clarity;

FIG. 5 is a view in partial vertical section of a pair of stacked, nested heat exchangers packs operatively positioned within a cooling tower beneath the hot water distribution basin of the latter;

Figure 6:
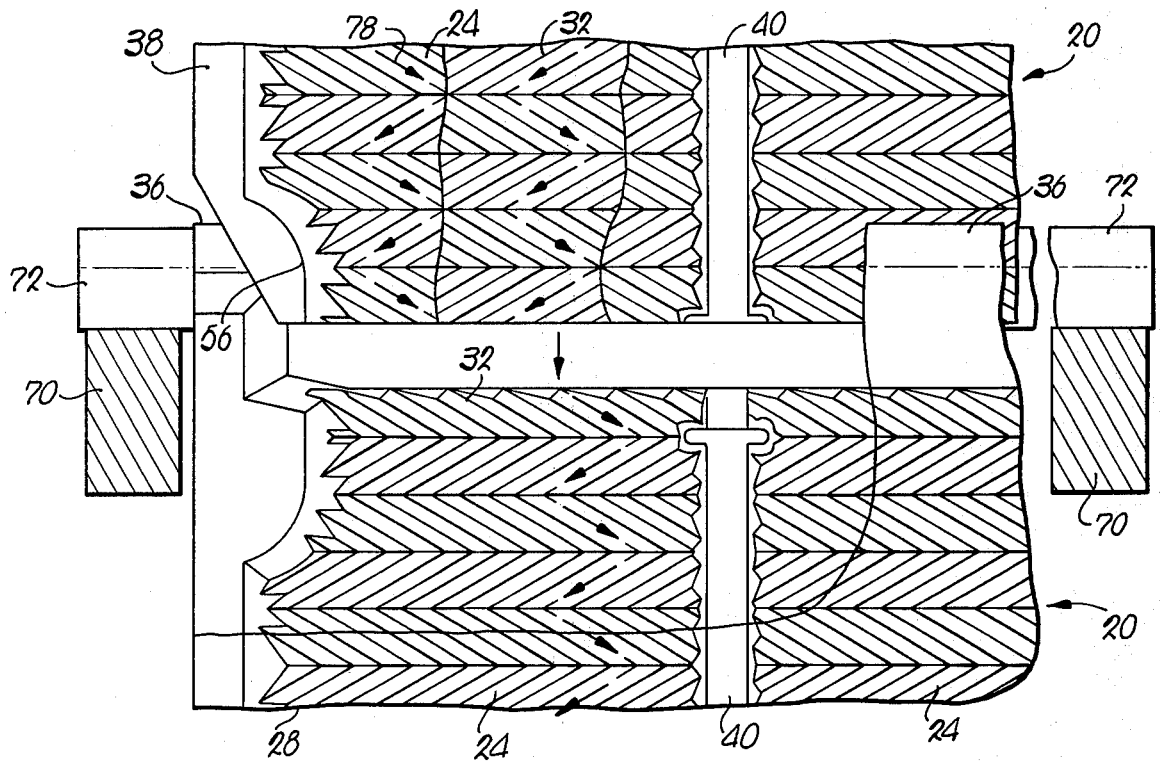
FIG. 6 is a fragmentary elevational view with parts broken away for clarity taken along line 6—6 of FIG. 5 and illustrating the nested junction between the vertically aligned exchanger packs.

A heat exchanger pack 20 in accordance with the invention is depicted in FIGS. 1–2. Broadly, each pack 20 comprises a plurality of elongated, juxtaposed, integral synthetic resin members 22 of inverted, substantially U-shaped configuration which are interconnected along the respective vertical marginal edges of the sidewalls 28 thereof by means of adhesive solvents or pressure-heat sealing techniques to define a freestanding, structurally distinct pack 20. In this manner, a series of spaced, hollow, open-ended thin tube-like hot water receiving structures 24 are defined between the interconnected sidewalls of adjacent U-shaped members 22, with open-sided cooling air passages 26 being defined by the transversely U-shaped configuration of each member 22. Thus, the passages 26 and structures 24 are in adjacent, alternating relationship throughout the width of pack 20.

Referring now to FIG. 2, it will be seen that the opposed sidewalls 28 of each U-shaped member 22 are configured to present a series of normally horizontally extending corrugated chevron patterns 30 which are vertically aligned to define a series of continuous, tortuous or serpentine flow paths 32 extending generally from the top of each sidewall section 28 to the bottom thereof. Although not depicted throughout the drawings for the sake of clarity, it is to be understood that the multiple chevron corrugation pattern extends substantially the entire height of each sidewall 28 of each member 22. In particular, the chevron patterns 30 are defined by elongated, pyramid-like, generally vertically extending ridges 44 with corresponding depression 46. It is to be noted that both the internal surfaces of the sidewalls 28 and the external surfaces thereof are configured in the described chevron pattern. Thus, each ridge 44 on the internal surface of a sidewall corresponds to a depression on the external surface thereof. Furthermore, the agle of inclination of directly opposed ridges 44 and respective depressions 46 are in opposite directions (see upper right-hand corner of FIG. 2) so that liquid flowing downwardly in the grooves of proximal vertical passage defining sidewalls 28 is deflected in different directions. As a consequence, where the tortuous liquid passages are substantially filled with liquid flowing downwardly therethrough, the resultant flow vectors of the liquid discharging from each inclined flow stage is essentially vertical. This not only maintains equal flow distribution through the horizontal extent of the members 22 but most importantly assures that liquid flow from the bottom edge of each liquid conveying section is generally vertical rather than angular, thus avoiding maldistribution of liquid from one level to another, as is clear from FIG. 6. In addition, the facing surfaces of the sidewalls of each U-shaped member 22 are provided with a plurality of spaced, knob-like projections 34 which are arranged for abutting interconnection in order to maintain the spacing between respective sidewalls 28 of each U-shaped member 22. In this regard the relatively wide spacing between the sidewalls of each member 22 prevents the collection of dust or vegetation particles within the passages 26 (with consequent decrease in heat-transfer efficiency) and moreover facilitate cleaning thereof should leaves or the like be allowed to enter the passages. A further example of the use of a multiple chevron corrugation pattern similar in many respects to that illustrated herein can be found in U.S. Pat. No. 3,733,063, issued May 15, 1973.

As shown in detail on FIG. 4, each U-shaped member 22 includes an uppermost, smooth, rounded top portion 36 with corrugated sidewalls 28 depending therefrom. Each sidewall 28 includes offset, vertically extending, generally planar connection panels 38 which define the lateral marginal edges thereof and permit the respective sidewalls 28 of adjacent U-shaped members 22 to be interconnected to define the hollow, hot water receiving structures 24 therebetween. As shown, the corrugated surface area of each sidewall 28 is recessed with respect to the marginal panels 38 so that a hollow, thin tube-like passage is presented between the interconnected sidewalls. Each sidewall 28 also includes a pair of laterally spaced, vertically extending connection or stiffening ribs 40 which are likewise offset from the corrugated surface thereof and adapted to be adhesively secured to corresponding ribs 40 on another sidewall section 28. In this manner, the hot water receiving structure 24 is divided into a number of discrete, identical, elongated hot water passages, which for exemplary purposes have been shown as separate channels. The ribs 40 significantly increase the structural rigidity of the sidewalls 28 and serve to prevent the characteristic, gravity-induced "creep" of the PVC material, which can be especially troublesome in the case of corrugated sheets.

It will also be seen that the terminal ends of each exchanger pack 20 are defined by what can be throught of as approximately one-half of a U-shaped member 22. In this respect each terminal member 48 includes an upstanding, planar connection panel 50 extending above the remainder of pack 20, as well as a sidewall 52 which is identical in every respect with each sidewall 28 of the U-shaped members 22, in order to permit mating attachment of the terminal members 48 to complete pack 20. Moreover, the sidewalls of each U-shaped member 22 and terminal members 48 are laterally constricted as at 54 so that the open-top hot water receiving structures 24 define between respective interconnected sidewalls 28 are of somewhat lesser width than the main body of the structures. The bottom of each sidewall 28 is also constricted as at 56 and angularly cut as at 57 so that the lower end of each exchanger pack 20 will complementally fit within and nest with the upper end of another exchanger pack, with the respective hot water receiving passages presented by structures 24 in each of the packs being in communication.

The exchanger packs 20 described above are preferably fabricated from a series of initially flat, vacuum-formed, integral sheets 58 depicted in FIG. 3. Each sheet 58 includes a pair of chevron-ribbed sidewall sections 28 as well as the generally planar midsection 36 adapted to define the uppermost rounded portion of each U-shaped member 22. The left-hand end of each sheet 58 terminates in a generally flat, uncorrugated panel section 50. In practice, the intermediate, generally U-shaped members of each pack 20 are formed from a length of sheet 58 referred to by the dimension "A", with the panel section 50 being removed. Dimension "B" (with panel section 50 intact) is employed for the leftmost end sheet 48 of a pack as illustrated in FIG. 1, while dimension "C" refers to the right hand end sheet of the pack wherein section 36 serves as the upstanding planar section 50 thereof. The sheets used in the formation of each pack 20 are in each case cut along the dotted lines depicted in the drawings, in order to ensure that each pack is of uniform shape and dimension.

Referring now to FIGS. 5 and 6, the indirect heat exchange apparatus hereof is shown in operative disposition in a crossflow cooling tower construction. The cooling tower is shown only fragmentarily but includes an upper hot water distribution basin 60 having a plurality of water delivery openings 62 therein for permitting hot water to gravitate towards the indirect heat exchange structure disposed therebelow. A pair of heat exchanger packs 20 are illustrated in the Figure with the respective packs being in stacked, nested relationship, and the air passages 26 thereof oriented for receiving ambient derived crossflowing cooling air currents. In this regard, a skeletal framework including support members 64, 66, 68 and 70 is employed for tensionably supporting the packs 20 in operative disposition beneath basin 60. Horizontally extending support elements 66 and 70 support a series of spaced, rounded top beams 72 which are adapted to complementally fit within the uppermost rounded portion 36 of each U-shaped member 22 making up the respective packs 20. In practice, it has been determined that it is only necessary to positively support every other U-shaped member 22 by means of a beam 72. Installation of each pack 20 may be completed if desired by stapling the upright terminal panels 50 thereof to adjacent structural members, for example as at 74.

Referring specifically to FIG. 6, it will be seen that the constricted bottom of each of the spaced sidewalls 28 defining the spaced, hot water receiving structures 24 is nestably received within the complemental upper ends of the corresponding hot water receiving structure 24 of the pack 20 therebelow. Thus, the elongated hot water receiving structures 24 of each pack 20 are in full communication so that hot water delivered to the uppermost pack 20 flows continuously through all packs therebelow. In addition, although only two packs are illustrated in FIG. 6, it is to be understood that virtually any number of such packs can be employed in practice, depending principally upon the desired use and heat load requirements to be met.

In use, hot water to be cooled is initially directed to basin structure 60 and allowed to descend through openings 62. By virtue of the fact that the uppermost end of upper pack 20 is spaced somewhat below basin 60, such initially hot water must descend through the air to reach the indirect heat exchange apparatus. When the latter is reached, the volumes of water flow down the respective hot water receiving structures 24 defined by the interconnected U-shaped members 22. In order to prevent undue channeling of the water, the rounded tops of the members 22 are preferably positioned directly below the openings 62 so that the water must impinge upon the rounded sections before flowing into the structure 24. In this regard, actual tests have demonstrated that the descending water entering the structures 24 causes a homogenous pattern of air bubbles to be entrained therewithin (arrow 75) by a qualified siphon phenomenon, so that the air and water mixture actually entering the respective structures 24 (arrow 76) contains a measurable amount of entrained air. Air entrainment is most pronounced when the water flow rates to the exchanger pack are sufficient to effect a near seal of the water-receiving structures 24, thereby precluding the possibility of venting the pack over its full height. Thus, during low water flow conditions the siphon-induced air entrainment is not as effective, and cooling is due primarily to film-type surface heat exchange. In any event, the entrainment phenomenon when applicable is important for a number of reasons.

First, entrained air has the effect of slowing the descent of the water through the hot water receiving structures 24 and moreover ensures that the water travels down the continuous, serpentine hot water paths 32 defined by the chevron-arranged corrugations discussed above. This tortuous water travel is illustrated by arrows 78 of FIG. 6. As can be appreciated, the intimate flowing contact of the hot water along the defining sidewalls 28 of structures 24 enchances the cooling efficiency of the overall exchanger since essentially all cooling is through the prime heat exchange surface of the sidewalls 28. Just as importantly however, the entrained air within the water descending through the structures 24 has the effect of ensuring that the normally slight negative pressures developed by the water gravitating through the structures 24 does not reach a level sufficient to cause inward collapse of the relatively thin sidewalls 28. That is, the descending volumes of hot water produce a slight negative pressure within each structure 24 by virtue of the siphon-like flow thereof. Without entrained air within such descending water, the sidewalls of the respective structures 24 could be subjected to negative pressure levels sufficient to cuase their collapse. It should also be noted that the slight siphon-induced negative pressures within the structures 24 are important in preventing untoward splash-out of water therefrom. This is especially significant in the case of synthetic resin exchangers since pinholes made during fabrication thereof, and minor leaks at the seams of such units, could present serious problems if the exchangers were operated at positive pressures, as is common with metallic finned tube constructions.

Figure 7:
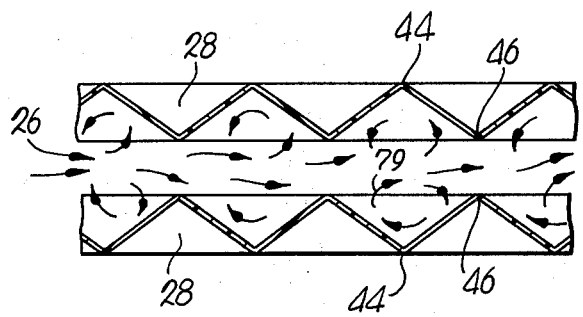
FIG. 7 is an enlarged, essentially schematic, fragmentary horizontal sectional view illustrating the manner in which the chevron channels of the heat exchanger sidewalls cause turbulence of cooling air flowing therepast.

In order to adequately cool the hot water gravitating through the exchanger packs 20, ambient derived cooling airstreams are induced to pass along the open passages 26 between the spaced structures 24 by means of mechanical fans or the stack effect of a hyperbolic natural draft tower, as is well known in this art. Heat from the hot water is thus passed through the thin PVC sidewalls 28 to the crossflowing cooling airstreams to effect the desired cooling of the initially hot water. In this respect, the chevron corrugations of the sidewalls are very important in enhancing the ultimate heat-transfer efficiency of the exchanger. This stems not only from the effects mentioned above (i.e., minimizing channeling of the water by ensuring that the latter travels along the internal serpentine flow paths), but also in causing turbulence of the cooling airstreams flowing past the external surfaces of the sidewalls 28. This effect is depicted schematically in FIG. 7 and illustrates that the undulating, chevron corrugated outer wall surfaces of each of the structures 24 causes eddies and other types of turbulence (illustrated by arrows 79) which would not obtain if the external wall surfaces were substantially planar in configuration. As can be appreciated, this turbulence increases the effective thermal contact between the cooling air and the sidewalls 28 of the respective structures 24, so that the hot water within the latter is more efficiently cooled.

It will also be recognized that the present exchanger apparatus presents a simplified heat flow path as compared with conventional finned tube exchangers. That is, substantially the entire surface area of each sidewall 28 is prime heat exchange area, that is, in direct simultaneous contact with the cooling air and hot water. By way of comparison, the fins of conventional finned tube exchangers (which carry the principal portion of the heat transferred) are so-called secondary heat exchange surfaces because they are not in direct, simultaneous contact with the liquid being cooled and the external cooling medium. In the present invention for example, heat must flow only across the relatively thin (about 15 mils) sidewalls 28. This of course has the effect of minimizing any heat transfer problems stemming from the fact that the preferred polyvinyl chloride fabrication material is of low heat conductivity as compared to metal.

Figure 8:
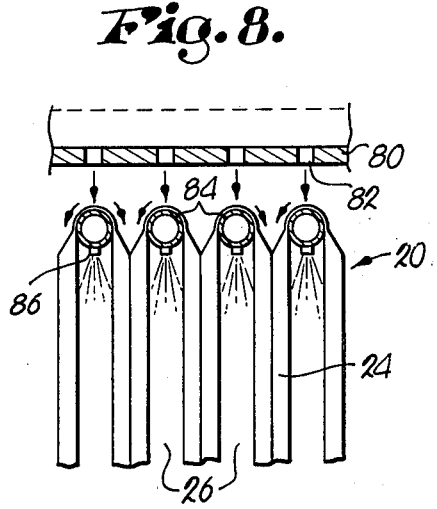
FIG. 8 is an essentially schematic illustration of a modified form of the invention wherein water may be introduced into the air passages through means which also act as a support for the exchanger packs.
Figure 9:
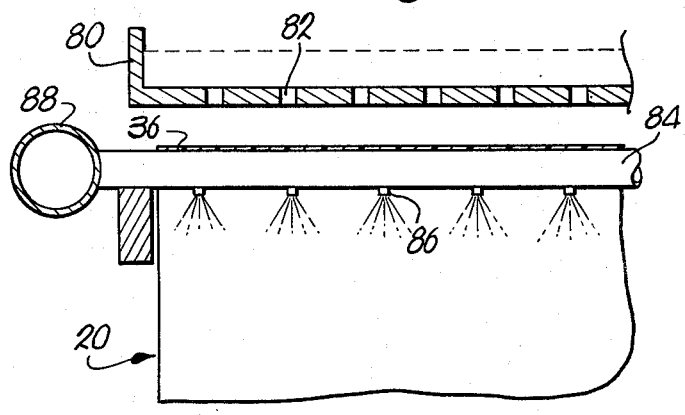
FIG. 9 is a schematic sectional view further illustrating the construction of FIG. 8.

Another embodiment of the present invention is depicted in FIGS. 8 and 9. In this instance, a hot water distribution basin 80 having delivery openings 82 therein is provided with a heat exchanger pack 20 suspended therebelow. In this case however, a series of elongated hot water delivery pipes 84 are positioned within the confines of the U-shaped members 22 and are employed for suspending the pack 20 in place of the support beams 72 illustrated in FIGS. 5–6. Each pipe 84 is provided with a plurality of spaced delivery openings or nozzles 86 along the length thereof, and the pipes are in operative communication with a common delivery header 88. Hence, during operation of indirect cooling section of the cooling tower as explained, it is also possible to provide a degree of direct thermal innerchange between descending water delivered through the support pipes 84 and the crossflowing cooling air currents passing through passages 26. This feature is especially significant in that it permits more flexibility in tower operation and enables a given size tower to handle a greater heat load than would be possible without the use of delivery pipes 84.

The inherent operational flexibility of the present indirect heat exchangers also permits use thereof in a number of specialized situations. Referring specifically to FIGS. 10–14, representative examples of this operational flexibility are illustrated in the context of a variety of cooling towers. In each case, a mechanical draft, crossflow cooling tower 90 is illustrated with varying types of heat exchange apparatus employed therein. Each tower 90 includes hot water distribution basin structure 92, a cold water collection basin 94 therebelow, and a central, mechanically powered fan 96 circumscribed by an upright, venturi-shaped cylinder 98 positioned atop the tower on an apertured fan deck 99 for inducing ambient derived air currents through the heat exchange apparatus of the tower in crossflowing relationship thereto. A central plenum chamber 100 is defined between respective opposed sections of the heat exchanger apparatus of the tower (which may be annular in form or in separate, opposed sections as illustrated).

Figure 10:
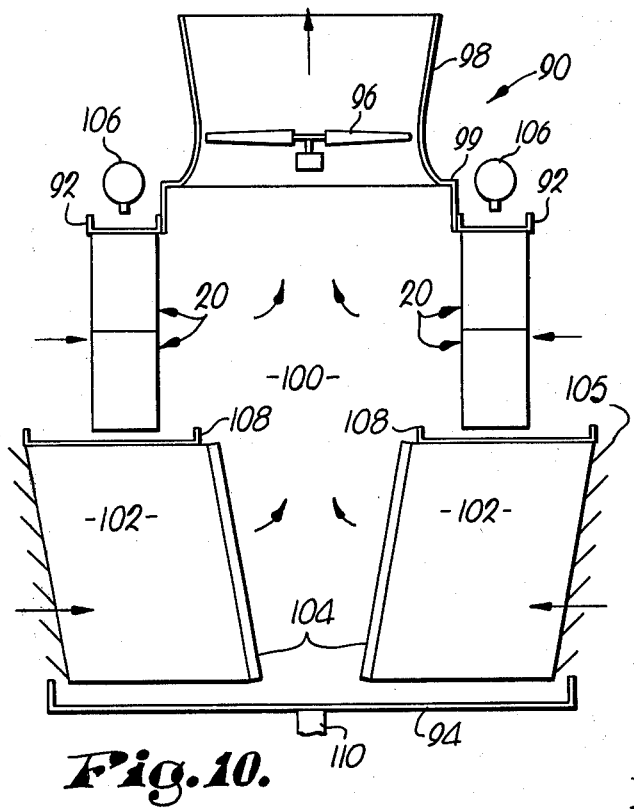
FIG. 10 is a schematic representation of a mechanical draft crossflow cooling tower employing separate indirect heat exchange structures in accordance with the invention positioned atop conventional evaporative fill assemblies.

Referring now to FIG. 10, it will be seen that a pair of stacked, nested exchanger packs 20 are provided on each side of the tower and situated directly above concentional opposed evaporative fill structure sections 102, the latter having drift eliminator structure 104 on the outlet faces thereof and a series of stacked, inclined inlet louvers 105 on the inlet faces thereof. In the operation of this tower, hot water is delivered through conventional header structures 106 and descends through basins 92 and the indirect heat exchanges packs 20 as described hereinabove. After initial cooling of the hot water in the indirect section of the tower, the water descends into secondary distribution basins 108 positioned beneath the pack and above the fill structure sections 102. At this point the water flows down through the evaporator sections of the tower for direct thermal interchange with the crossflowing air currents drawn therethrough (and through packs 20) by means of fan 96. It is to be appreciated in this respect that any one of a number of conventional evaporative fill structures can be employed in this context for the purpose of increasing the surface area of the gravitating water for enhanced, more efficient thermal contact with the crossflowing cooling airstreams. Finally, cooled water collected in basin 94 is directed through pipe 110 for reuse or disposal.

Figure 12:
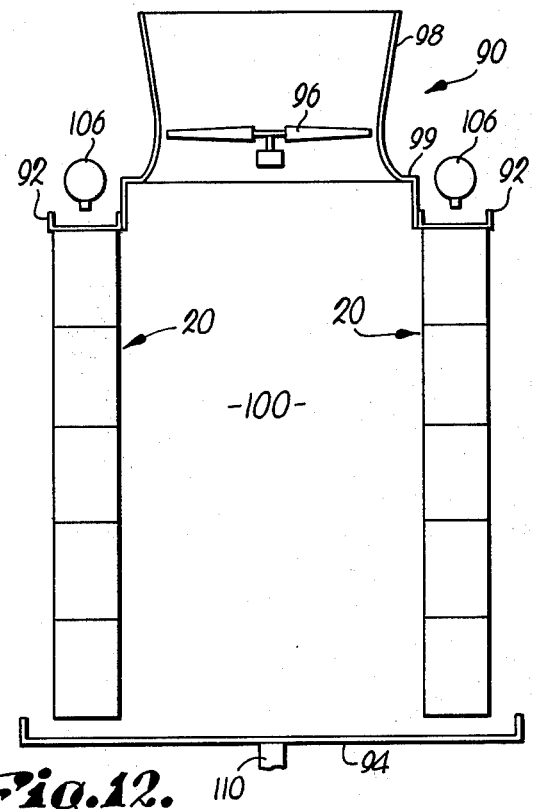
FIG. 12 is a schematic representation of a mechanical draft crossflow cooling tower employing opposed, indirect heat exchange sections in accordance with the invention.

FIG. 12 illustrates a purely dry tower employing a pair of spaced, opposed heat exchange sections, each composed of a series of vertically stacked, nested heat exchanger packs 20. In this instance, the cooling is purely by indirect thermal interchange and is accomplished in accordance with the methods fully described above.

Figure 13:
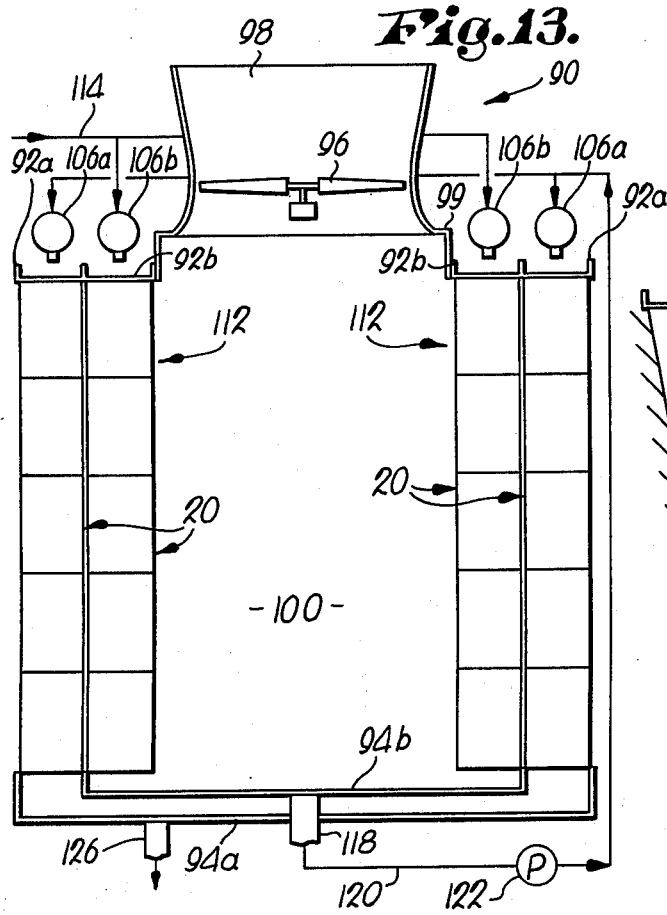
FIG. 13 is a schematic representation of a mechanical draft crossflow cooling tower having a two-pass indirect heat exchange construction with means for recirculating partially cooled volumes of hot water back to the heat exchange apparatus.

Another type of dry cooling tower construction is illustrated in FIG. 13. In this instance plenum chamber 100 is defined by a pair of spaced, opposed indirect heat exchanger assemblies 112. Each assembly 12 comprises two side-by-side sets of vertically stacked, nested heat exchanger packs 20. In addition, separate distribution basins 92a and 92b, and collection basins 94a and 94b, are provided for the outer and inner series of nested packs 20, along with separate distribution header structures 106a and 106b. In operation, hot water is initially delivered through line 114 to the inner distribution headers 106b for descending travel through the inner indirect heat exchanger packs 20. After initial passage through these packs, the partially cooled water collected in basin 92b is allowed to pass therefrom through recirculation pipe 118 and 120. A pump 122 is interposed within line 120 and directs the partially cooled water back to the distribution headers 106a at the top of the tower. The partially cooled water is thus allowed to descend through the outermost packs 20 and is ultimately collected within the outer basin 94a for ultimate return through line 126. This type of tower is particularly advantageous in that the amount of cooling of the initially hot volumes of water can be more precisely controlled. For example, during light thermal load or cold weather operating conditions it may be necessary only to run the water through one path of the tower and not recirculate the same for a second pass.

Figure 11:
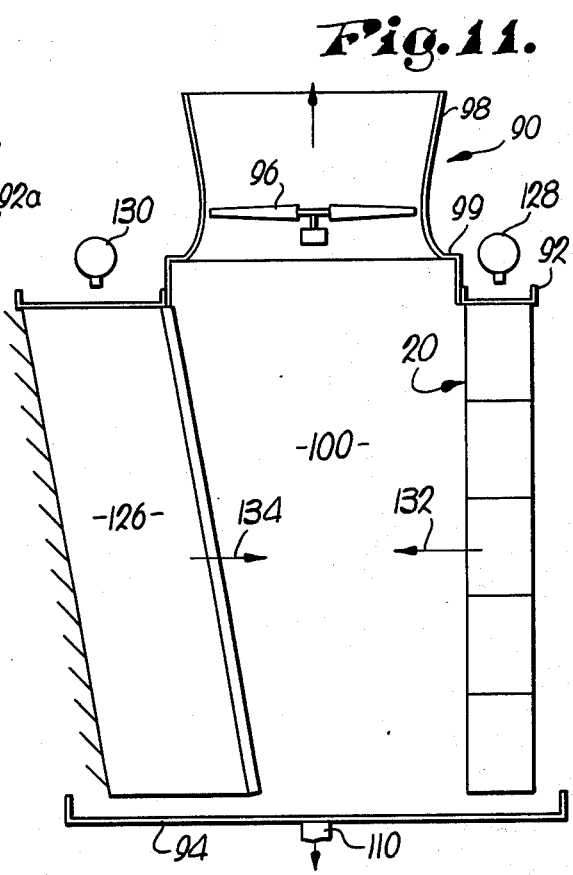
FIG. 11 is a schematic representation of a mechanical draft crossflow cooling tower employing opposed evaporative fill and indirect heat exchange sections respectively.

The tower depicted in FIG. 11 is especially adapted for situations where plume abatement is a major concern. The tower employs a first dry exchange section defined by stacked packs 20 with an evaporative fill section 126 in opposed, facing relationship thereto. Separate headers 128 and 130 are provided for selectively directing quantities of hot water to the respective heat exchange sections of the tower. In the operation of this unit, the amount of evaporative cooling (and thereby, water consumption) can be precisely controlled, or when ambient weather conditions are such that fog formation becomes troublesome, the tower can be utilized essentially as a dry unit with little or no wet cooling. However, when water consumption or fog problems are not of concern, a substantial amount of the hot water to be cooled can be directed to the evaporative section for the most efficient cooling thereof.

In addition, in the case of the FIG. 11 tower the crossflowing induced airstreams 132 and 134 leaving dry and wet exchange sections of the tower come into direct, comingling relationship so that the air leaving the tower through stack 98 is effectively admixed to thus minimize the possibility of producing a visible fog plume at the outlet of the tower.

Figure 14:
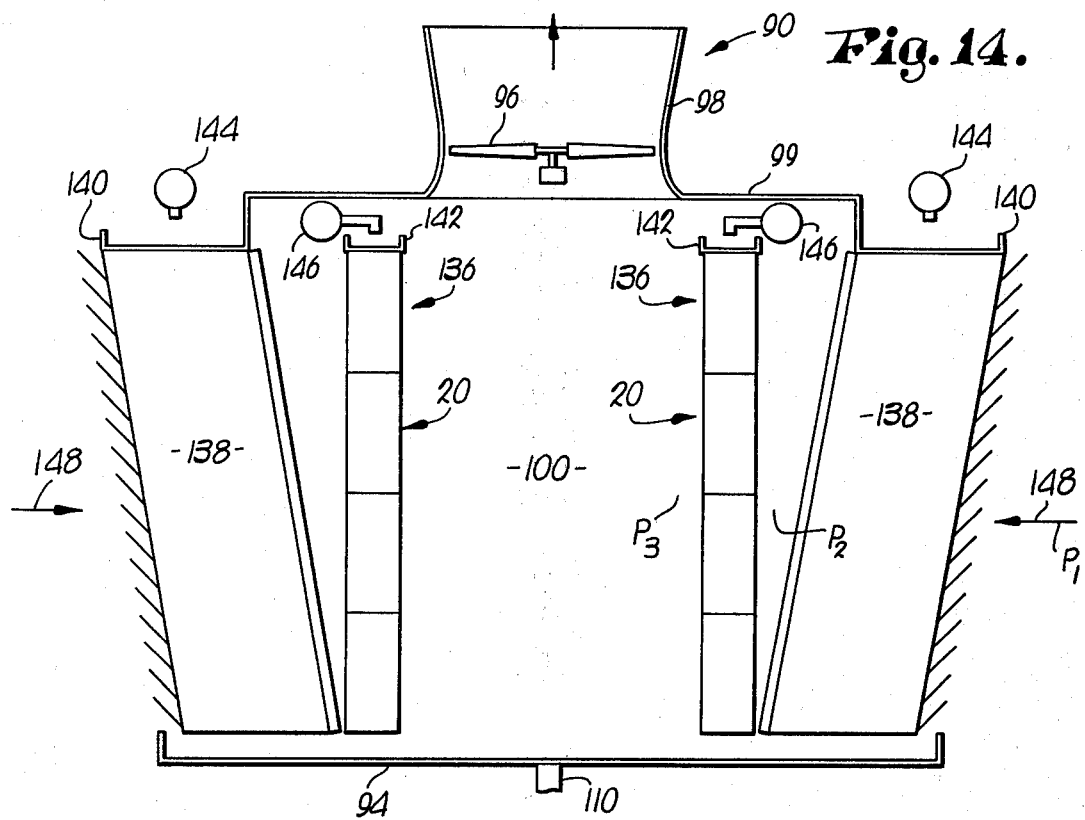
FIG. 14 is a schematic representation of a mechanical draft crossflow cooling tower employing an outermost evaporative fill section along with inner, indirect heat exchange apparatus.

Yet another tower application is illustrated in FIG. 14 wherein multiple pack, indirect heat exchange sections 136 are positioned inboard of adjacent, outermost evaporative fill sections 138 so that air leaving the latter will thereafter pass in serial order through the dry section of the tower. Separate distribution basins 140 and 142 are provided for the wet and dry sections respectively, along with separate headers 144 and 146. During operation of this tower, opposed, crossflowing cooling airstreams (represented by arrows 148) first pass through the outer evaporative sections 138 and thence through the adjacent dry sections 136 before admixing in plenum chamber 100 and being returned to the atmosphere through stack 98.

Figure 15:
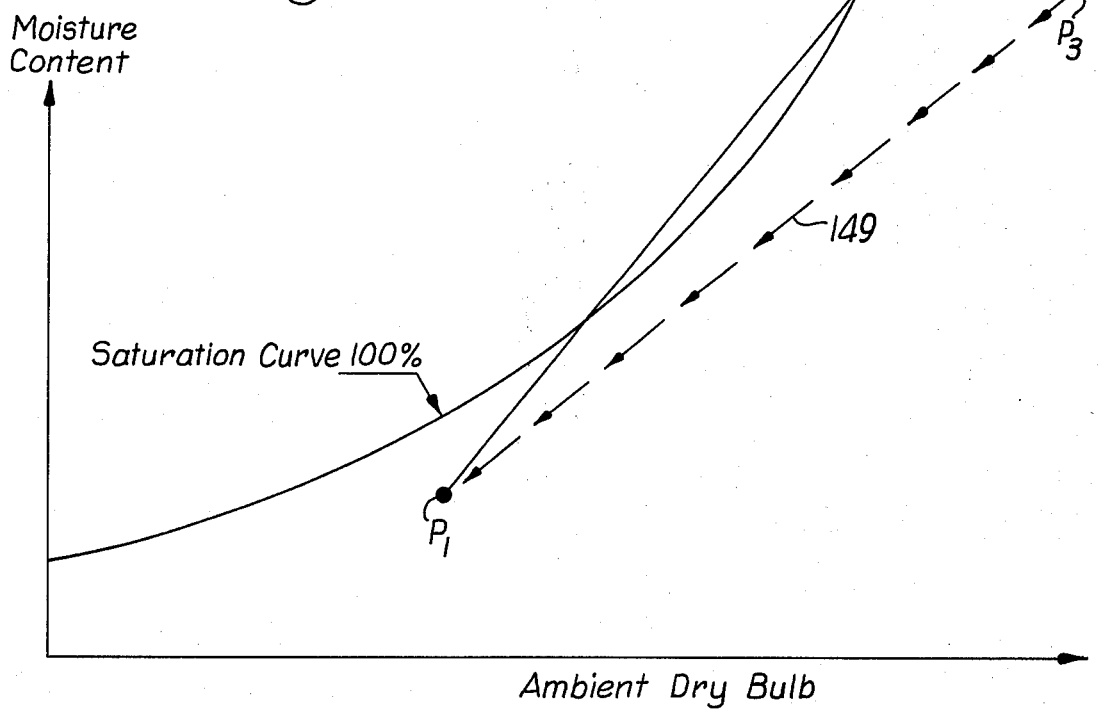
FIG. 15 is a graphical representation illustrating a psychrometric analysis of the water cooling and plume abatement quantities of the tower illustrated in FIG. 14.

In order to demonstrate the fog abatement qualities of the tower illustrated in FIG. 14, and particularly with respect to the use of the indirect heat exchangers hereof, the graphical reprsentation of FIG. 15 is presented. This graph illustrates a psychrometric analysis of the water cooling performance of the depicted series-path tower and demonstrates that during normal operations no visible fog plume is produced at the outlet thereof. Referring specifically to the graph and FIG. 14., point $P_1$ represents the average heat and mass balance quality of the ambient air before entering the cooling tower. Point $P_2$ represents this quality of the air leaving the wet section of the tower, and point $P_3$ represents air quality where the air leaves the dry section of the tower (comprised of stacked heat exchanger packs 20). The arrow line 149 extending from point $P_3$ to $P_1$ represents the heat and mass balance quality of a typical effluent air mixture as discharged from stack 98, and indicates that as the air is discharged, it blends with ambient air and finally reverts to ambient quality (i.e., point $P_1$) at some distance from the tower outlet. It is important to note that arrow line 149 always remains below the saturation curve illustrated on the graph; this therefore confirms that no visible fog or plume will be formed adjacent the outlet of the cooling tower. Hence it is clear that the series-path tower of FIG. 14 utilizing the exchanger packs 20 hereof is capable of effectively cooling hot water without objectionable fog formation.

It will be appreciated from the foregoing that use of the synthetic resin exchangers hereof is highly advantageous, even in very large cooling towers capable of handling high heat loads. The exchangers are low in cost, corrosion-free (which permits cooling of brackish or salt water) and non-fouling to facilitate maintenance thereof. Most important however, the cooling effectiveness is more than doubled when compared with conventional metal finned-tube constructions.

Having thus described the invention what is claimed as new and desired to be secured by Letters Patent is:
1. Water cooling apparatus comprising:

a distributor adapted to receive and distribute initially hot quantities of water; and essentially indirect heat exchange means comprising a plurality of open top and bottom water conveying structures disposed beneath said distributor with air passages therebetween oriented for passage of cooling air therethrough in indirect heat exchange relationship to water gravitating through the structures, each of said structures having performed, shape retaining spaced, opposed sidewalls of relatively thin synthetic resin sheet material configured to present a series of tortuous water flow paths leading generally from the top of said structures to the bottom thereof, the open tops and lower open bottoms of the structures being exposed to the atmosphere to allow siphonic entrainment of air in the water as it flows from said tops of the structure to the open bottoms thereof.

2. A water cooling tower comprising:

a hot water distributor; a cold water collection basin beneath said distributor;

heat exchange apparatus situated between said distributor and basin, including an indirect heat exchange having a plurality of elongated open top and bottom, hollow, hot water conveying structures communicating at said tops thereof directly with the atmosphere and positioned beneath said distributor in a generally upright orientation for receiving hot water therefrom, each of said structures having a pair of performed, shape retaining, spaced, opposed sidewalls of relatively thin synthetic resin sheet material with at least the interior faces of the latter configured to present a series of tortuous water flow paths leading generally from the top of said structures to the bottom thereof, said structures being disposed in spaced relationship to define therebetween a plurality of cooling air passages;

means supporting said heat exchange apparatus between said distributor and basin with the lower open bottoms of the structures exposed to the atmosphere above the level of water collected in said basin to allow siphonic entrainment of air in the water as it flows from the top to the bottom of the structures; and means for directing ambient derived cooling air between said distributor and basin and along said passages for indirect thermal interchange with hot water within said structures through the sidewalls of the latter.

3. The tower as set forth in claim 2 wherein said material is polyvinyl chloride.

4. The tower as set forth in claim 2, wherein said indirect heat exchanger comprises at least one pack, defined by a series of elongated members of inverted, substantially U-shaped configurations which are interconnected together along the opposed, vertical marginal edges thereof to present hot water conveying passages between the adjacent, interconnected sidewalls of said members.

5. The tower as set forth in claim 4, including abutting knob-like projections on the opposed faces of the sidewalls of said U-shaped members remote from the adjacent U-shaped members for maintaining the spacing between said side walls.

6. The tower as set forth in claim 4, wherein said adjacent sidewalls of said respective members are also interconnected along spaced, vertical extending panels in order to divide said passages into discrete sections.

7. The tower as set forth in claim 4, wherein said support means comprises frame elements extending beneath the top of said inverted U-shaped members in order to suspend said pack therefrom.

8. The tower as set forth in claim 4, including elongated hot water delivery pipes situated within the confines of said inverted U-shaped members and operable to distribute hot water therewithin for direct thermal interchange with said cooling air; and means for delivering hot water to said pipes for said distribution.

9. The tower as set forth in claim 2, wherein the corresponding interior and exterior faces of said sidewalls are configured to present said tortuous path configuration.

10. The tower as set forth in claim 9, wherein said sidewalls are corrugated to present a series of normally horizontally extending chevron patterns which are configured to define continuous, serpentine, vertically extending paths.

11. The tower as set forth in claim 2, wherein said heat exchange apparatus comprises a plurality of generally upright, superposed exchanger packs having open bottoms and complementally nested together, with the hot water conveying passages of the separate packs being in communication to define elongated, continuous hot water passages throughout the length of said apparatus.

12. The tower as set forth in claim 2, wherein the open tops of said structures are spaced below said distributor in generally coplanar relationship permitting simultaneous direct entrainment of ambient derived air with the hot water descending from the distributor and into said structures.

13. The tower as set forth in claim 2, wherein said heat exchange apparatus also includes evaporative fill structure operable to increase the surface area of hot water to be cooled for direct evaporative thermal interchange with said cooling air.

14. The tower as set forth in claim 13, wherein said fill structure is disposed below said indirect heat exchanger and above said basin for the reception of partially cooled water from the indirect heat exchanger.

15. The tower as set forth in claim 13, wherein said fill structure and indirect heat exchanger are positioned in spaced, opposed relationship on opposite sides of said tower, said air directing means being operable to draw separate streams of air through said fill structure and indirect heat exchanger respectively, and to admix the airstreams leaving the same prior to discharging the airstreams to the atmosphere.

16. The tower as set forth in claim 13, wherein drift eliminator structure is positioned adjacent the exit face of said fill structure for removing entrained water droplets from the cooling air leaving the fill structure.

17. The tower as set forth in claim 13, wherein said fill structure is in side-by-side relationship with said indirect heat exchanger, there being means for separately directing volumes of hot water to said fill structure and indirect heat exchanger respectively 18. The tower as set forth in claim 17, wherein said fill structure and indirect heat exchanger are positioned adjacently for serial passage of said cooling air through the fill structure and the indirect heat exchanger.

19. The tower as set forth in claim 2, wherein said heat exchanger apparatus includes inner and outer adjacent, side-by-side indirect heat exchangers, there being means for the delivery of hot water to the inner exchanger, and for recirculation of partially cooled water therefrom back to the top of the outer exchanger for travel therethrough.

\* \* \* \* \*

UNITED STATES PATENT AND TRADEMARK OFFICE
CERTIFICATE OF CORRECTION

PATENT NO. : 3,995,689
DATED : December 7, 1976
INVENTOR(S) : Robert E. Cates

It is certified that error appears in the above–identified patent and that said Letters Patent are hereby corrected as shown below:

In Column 11, lines 10 and 32, please delete the word "performed" and substitute therefor --preformed--.

In Column 11, line 26, please delete the word "exchange" and substitute therefor --exchanger--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks